United States Patent [19]

Eisner et al.

[11] Patent Number: 4,858,907
[45] Date of Patent: Aug. 22, 1989

[54] SYSTEM FOR FEEDING ENVELOPES FOR SIMULTANEOUS PRINTING OF ADDRESSES AND BAR CODES

[75] Inventors: Lawrence F. Eisner, Cheshire; Bruce E. Hurd, Monroe, both of Conn.

[73] Assignee: Bryce Office Systems, Inc., Oxford, Conn.

[21] Appl. No.: 234,205

[22] Filed: Aug. 19, 1988

Related U.S. Application Data

[63] Continuation-in-part of Ser. No. 918,122, Oct. 14, 1986, abandoned.

[51] Int. Cl.$^4$ ............................................... B65H 3/06
[52] U.S. Cl. ..................................... 271/124; 271/146
[58] Field of Search ................. 271/121, 124, 125, 146

[56] References Cited

U.S. PATENT DOCUMENTS

| | | | |
|---|---|---|---|
| 2,368,519 | 1/1945 | Burckhardt | 271/125 X |
| 3,933,350 | 1/1976 | Mignano | 271/125 X |
| 4,437,658 | 3/1984 | Olson | 271/146 X |
| 4,529,187 | 7/1985 | Einem | 271/121 X |

Primary Examiner—Richard A. Schacher
Attorney, Agent, or Firm—Haynes N. Johnson

[57] ABSTRACT

An envelope feeding assembly providing for the individual, lengthwise feeding of envelopes and enabling printing thereon while said envelopes are in motion, including an envelope storage bin for holding a stack of envelopes prior to printing and having a gate with a driven feed roller and a control surface defining an envelope nip leading from the bin to the print head array, transport rollers to carry envelopes from the gate to the platen, envelope position sensors to sense the leading and following edges of envelopes passing through said transport rollers and to produce control signals corresponding to envelope position, and a controller to receive the timing and control signals and to control the feed roller and to control the "start time" and speed of printing, so that envelopes may be printed seriatim and lengthwise while continuously moving.

17 Claims, 8 Drawing Sheets

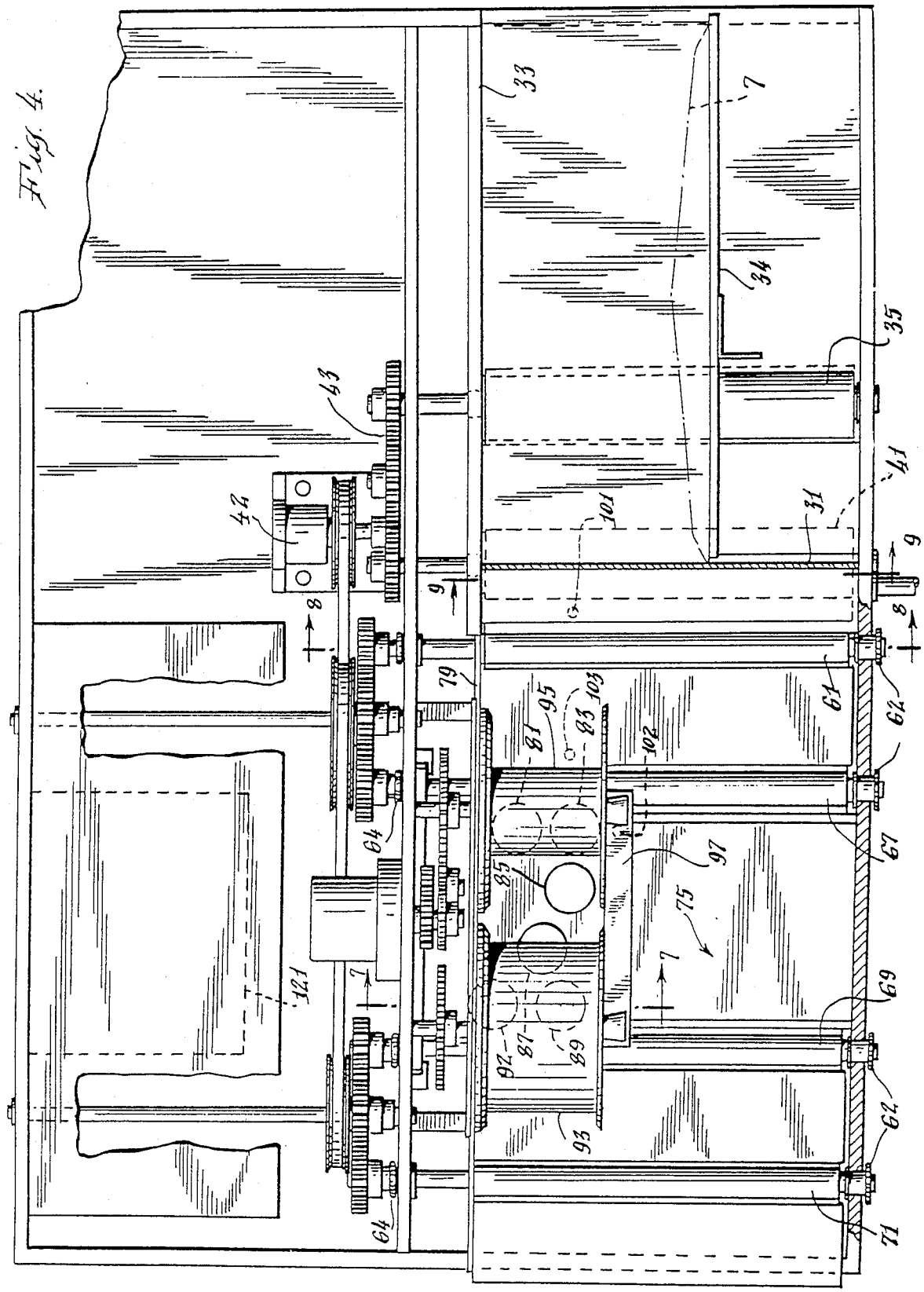

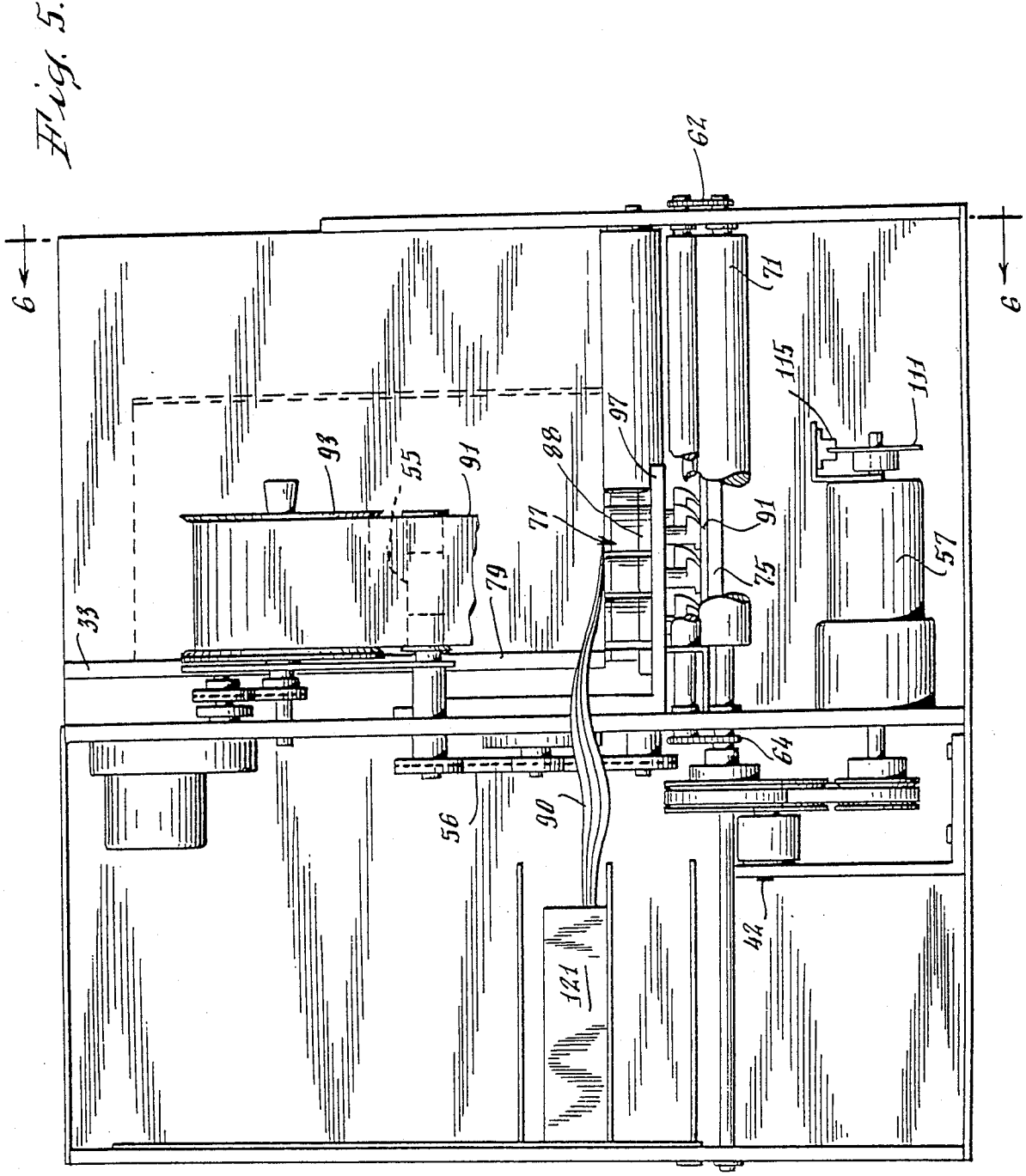

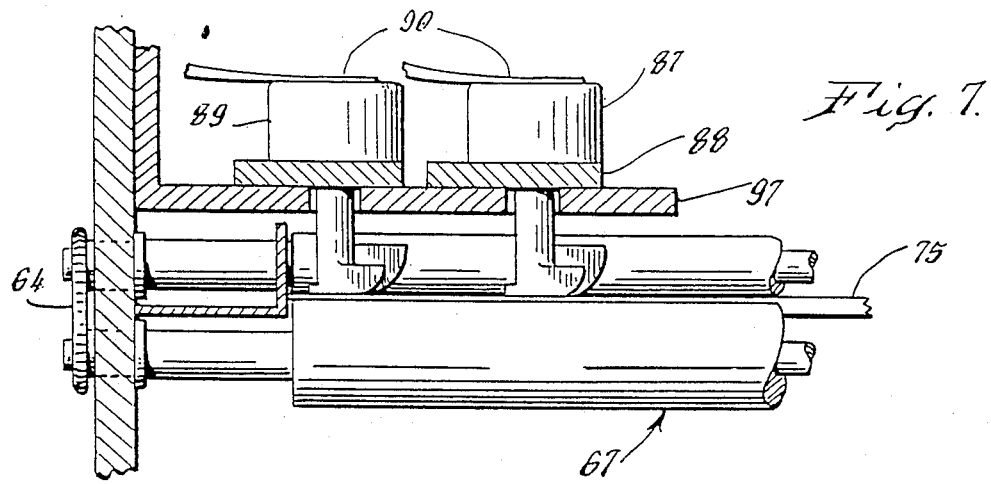
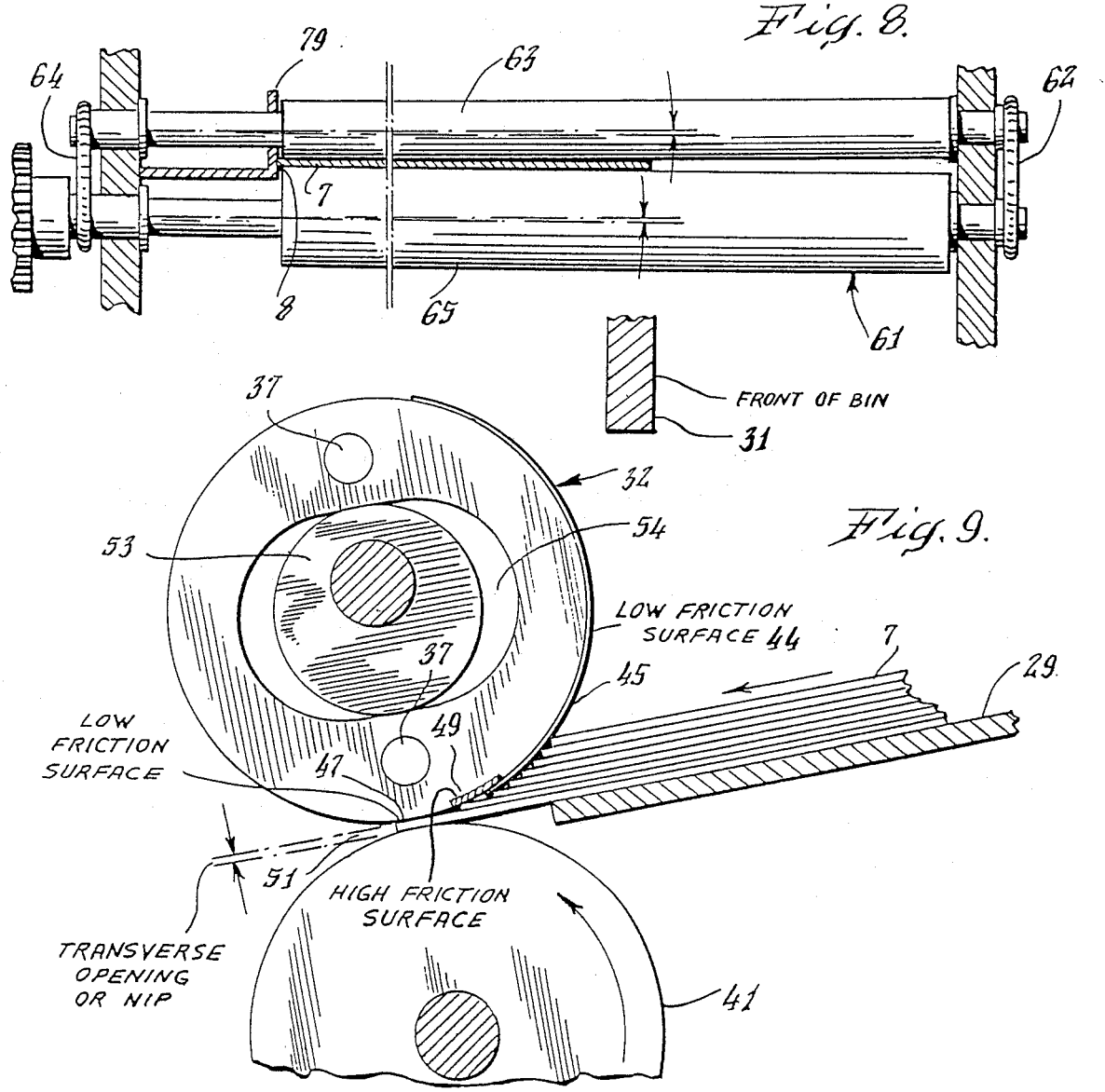

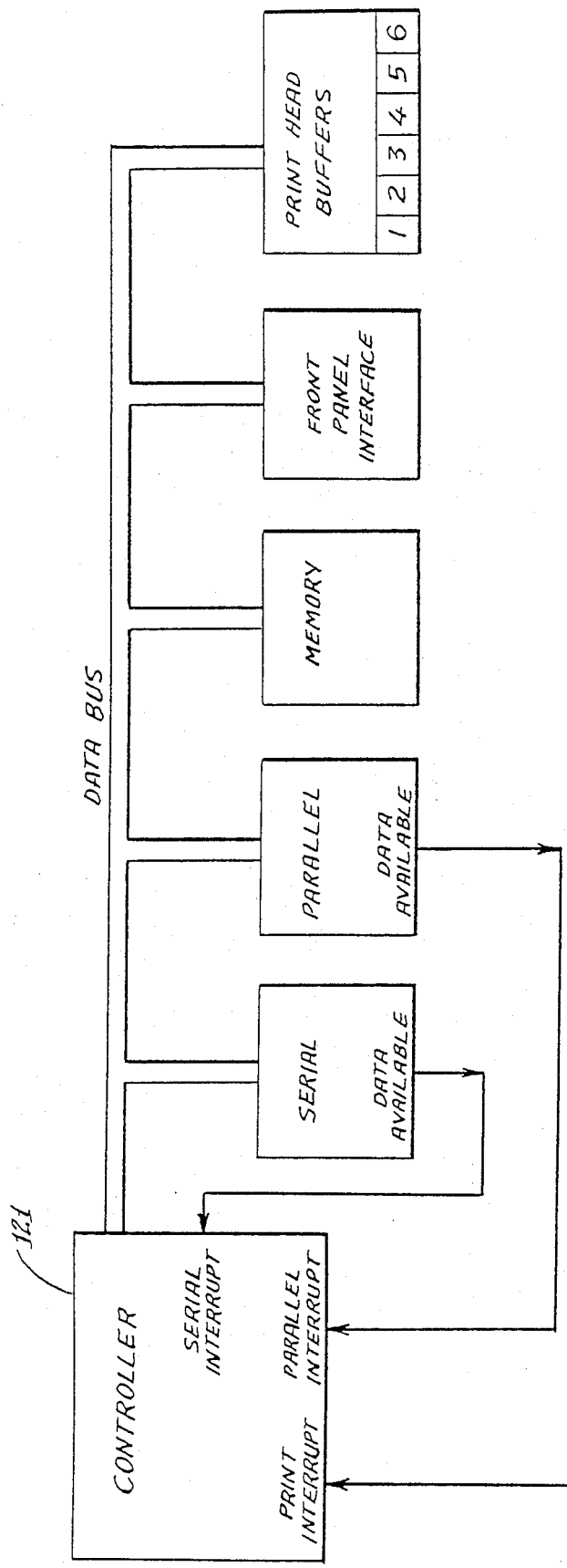
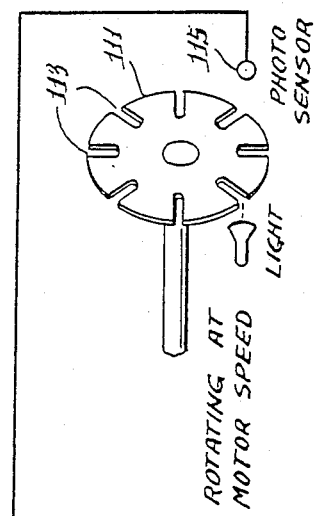
Fig. 10.

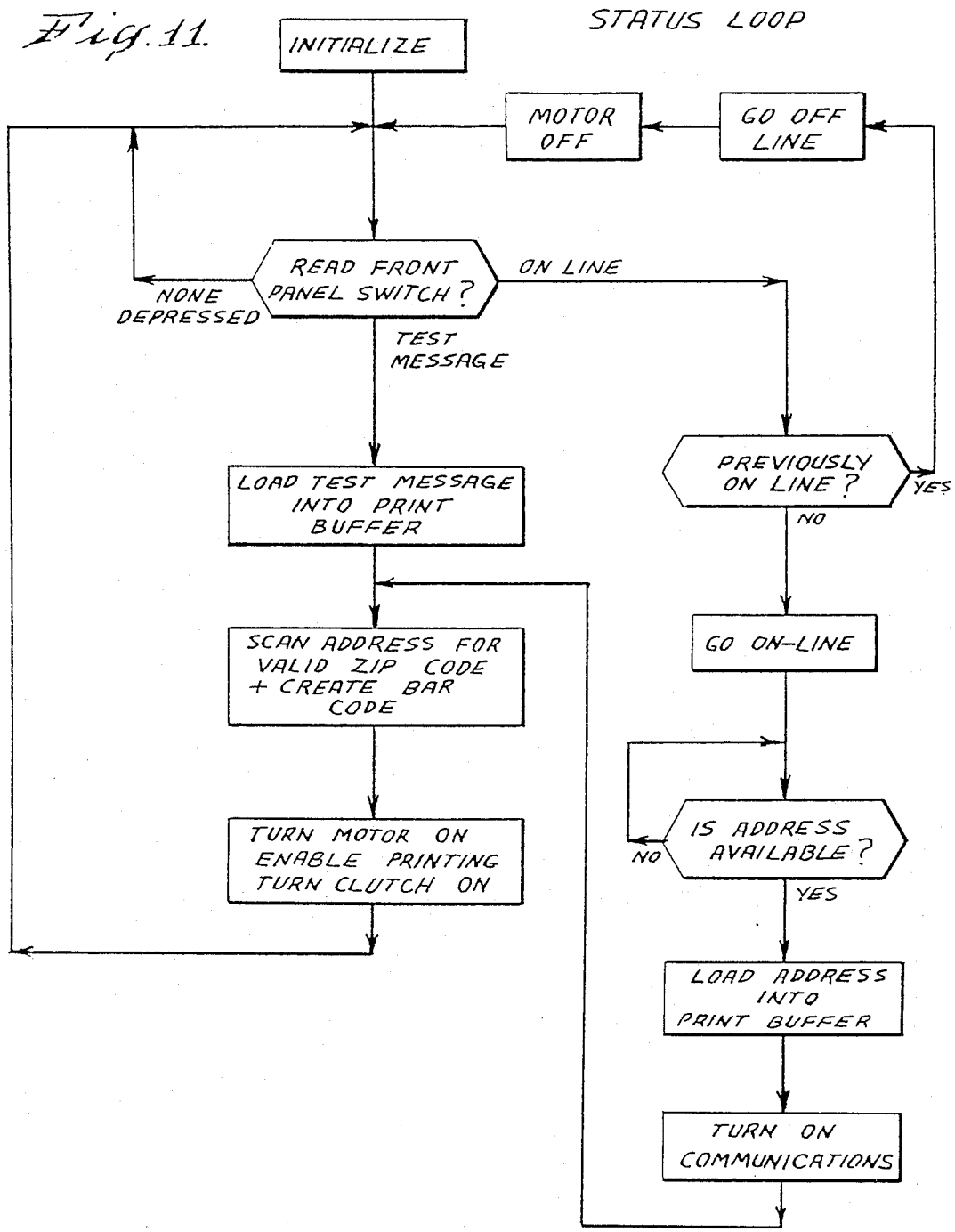

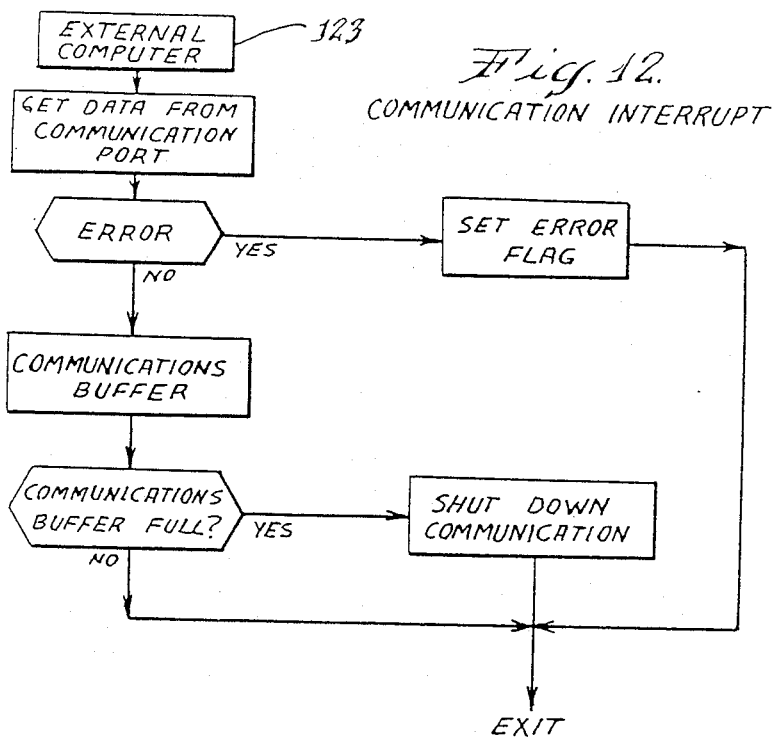
Fig. 12. COMMUNICATION INTERRUPT
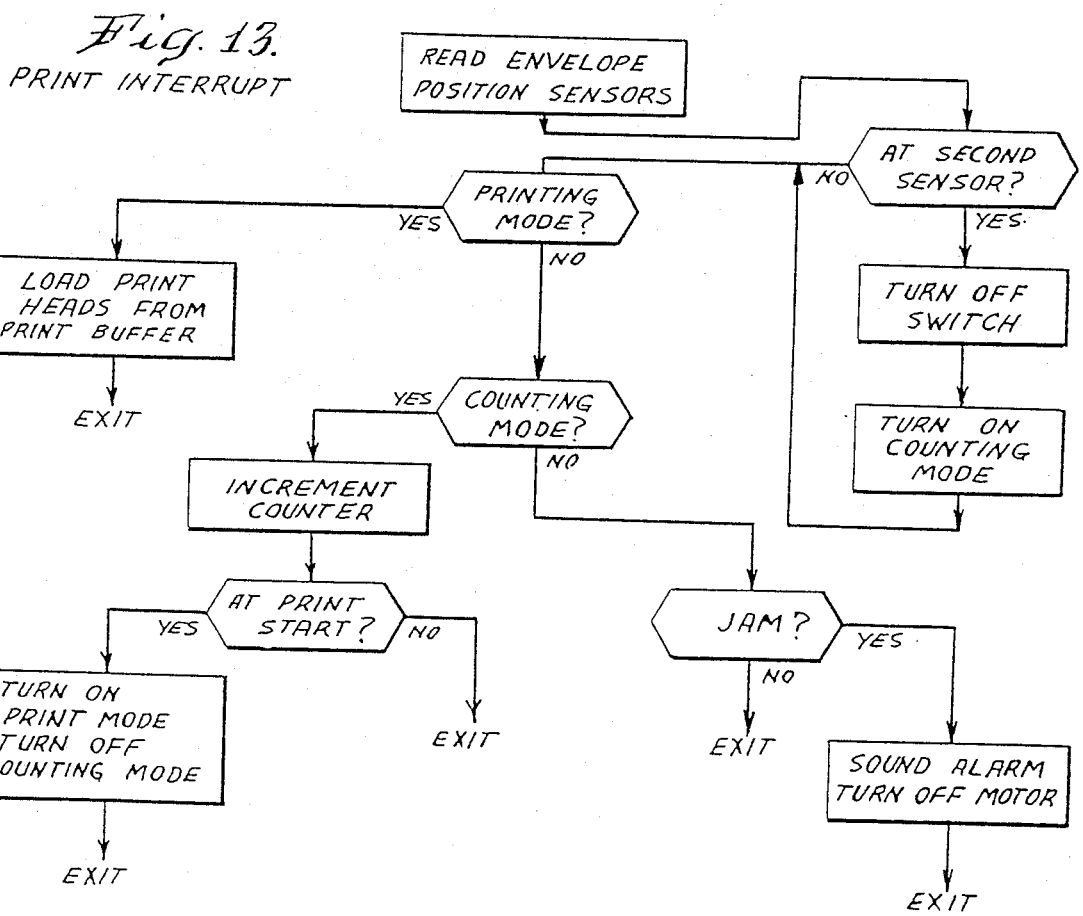
Fig. 13. PRINT INTERRUPT

SYSTEM FOR FEEDING ENVELOPES FOR SIMULTANEOUS PRINTING OF ADDRESSES AND BAR CODES

FIELD OF THE INVENTION

This application is a continuation-in-part of application Ser. No. 06/918,122, filed Oct. 14, 1986 now abandoned.

This invention relates to the field of envelope feeding systems. In particular, it relates to systems that feed envelopes to a printer that imprints a bar code address at the same time as imprinting the normal, legible address.

The Post Office is beginning to utilize automated mail sorters which sort envelopes on the basis of a zip code encoded as a machine-readable bar code. Such encoded bar code, to be acceptable, must meet strict specifications as to size, spacing of bars, and placement upon the envelope. Accordingly, there is a need for an accurate, but relatively inexpensive feeder for such a printer.

BRIEF SUMMARY OF THE INVENTION

A computer-controlled addressing system is provided that is capable of rapidly addressing envelopes in legible print and at the same time imprinting the zip code in a predetermined bar code format at a specified location on the envelope. This is done by printing the three to five lines of legible address and the line of bar code in parallel.

The envelopes are fed one at a time lengthwise from one end to an array of dot matrix printer heads, one for each line. There is one printer head for each line, and the heads are offset to permit concurrent, serial printing of all the lines at once. The spacing of the text along the lines is controlled by software associated with an internal system controller. The envelope moves longitudinally, at a constant speed, during printing.

Envelopes are fed from a stack placed in a sloping bin adjacent to the print heads. A lobed feed roller serves to vibrate the stack while a driven feed roller at the lower end serves to draw envelopes in through a gate one at a time.

Transport rollers, together with envelope-detecting sensors, synchronize flow of individual envelopes under the print heads. These rollers are biased to press the lower longitudinal edge of each envelope against a back fence during printing so that accurate alignment is achieved for the bar code.

To enhance uniformity between characters and left justification, all of the print head array is located between two proximate pairs of transport rollers, and the "start print" sensor is located after the pair of transport rollers last passed through before printing commences.

DESCRIPTION OF THE DRAWINGS

FIG. 4 is a top plan view of our addresser. The cover has been removed to show some of the inner structure.

FIG. 5 is a left elevation, with the cover removed and partially broken away to show the print head array.

FIG. 7 is a vertical section, taken on line 7—7 of FIG. 4, showing details of the print heads.

FIG. 8 is a vertical section, taken on line 8—8 of FIG. 4, showing one pair of drive rollers.

FIG. 9 is a vertical section from the front, taken on line 9—9 of FIG. 4, showing details of the envelope feed.

FIG. 10 is a generalized flow chart showing its interrelationship with the timing control wheel.

FIGS. 11, 12, and 13 are flow charts describing the control software.

DETAILED DESCRIPTION OF THE INVENTION

Background

The addition of machine-readable bar code on the face of envelopes to encode delivery zip codes allows mail to be sorted at a much faster pace than would otherwise be, thus allowing mail to be delivered more quickly and more economically. Such efficiency is enhanced if the human-readable address can be imprinted at the same time.

Achievement of this efficiency is made possible by precise placement of the address, and particularly the bar code, on the envelope in accordance to rigid specifications.

To satisfy the Postal regulations, the bar code must start 4 inches from the right-hand edge of the envelope (with a maximum error of $+0$ and $-\frac{1}{8}''$). It must be $\frac{1}{4}'' \pm 1/16''$ from the bottom edge, have bars of $0.050 \pm 0.010$ and $0.125 \pm 0.010$ in height, $0.020 \pm 0.005$ in width and horizontal spacing of bars of $21 \pm 1$ bars per inch. The bar code addressing system of our invention meets these requirements.

Until now, one wishing to produce a mass mailing first had to print labels on a conventional printer and then affix the labels to envelopes, all at a substantial cost. The present system, by contrast, will receive these addresses directly from the user's computer data base and will print five-line addresses, together with a proper bar code, directly upon the envelopes, all in a single pass while the envelope is continually moving at a constant speed. The five address lines and the bar code line will be printed simultaneously, in parallel, with the printing being done lengthwise of each line.

An effort has been made in the past to print lines in parallel. The system required specially designed, thin dot printer heads, so the heads could be positioned one next to the other. An example of this will be found in Matschke U.S. Pat. No. 4,462,706 and in his related U.S. Pat. Nos. 4,134,691 and 4,218,148.

Another prior envelope printer utilized a single 64-wire print head for printing multiple lines on envelopes longitudinally. However, it included no means for tracking envelope position to assure precisely positioned printing and used changing speeds of movement of the envelope during the printing cycle.

Broad Description Of The System

Figure 1:
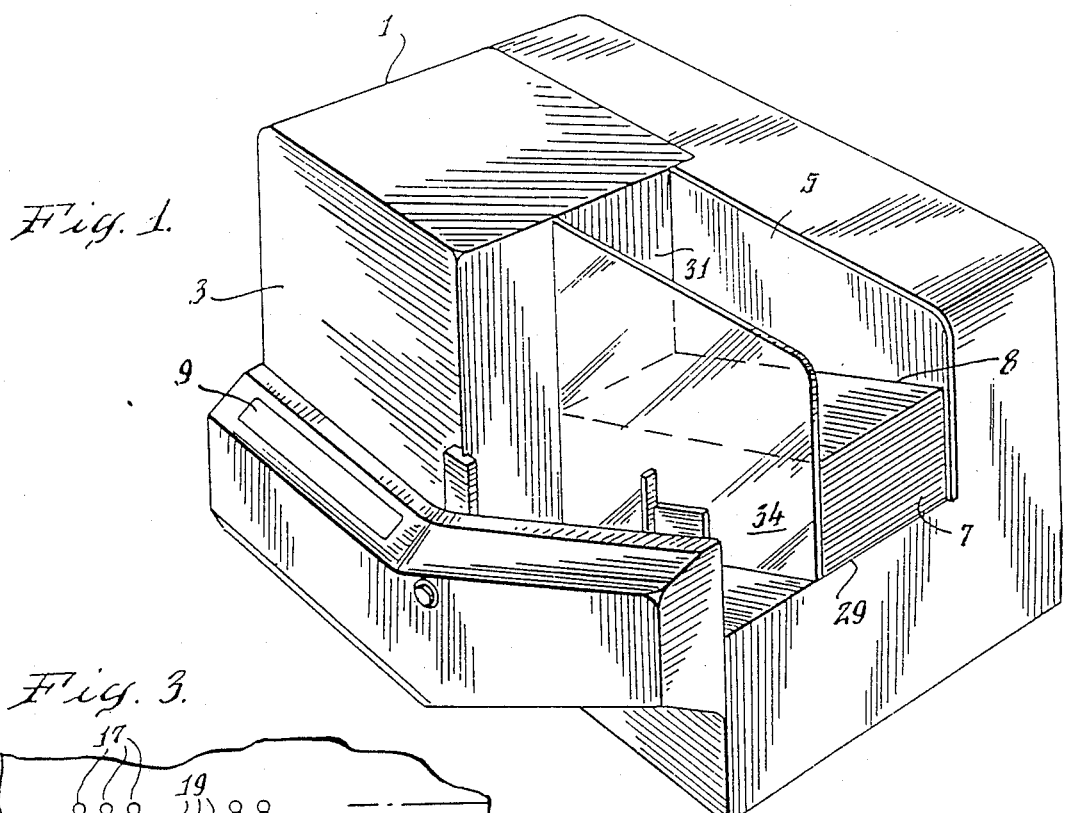
FIG. 1 is a perspective view of the bar code addressing system of our invention. The envelope feeding bin is seen to the right. Envelopes are fed from the bottom of the stack and move towards the left through the unit.
Figure 3:
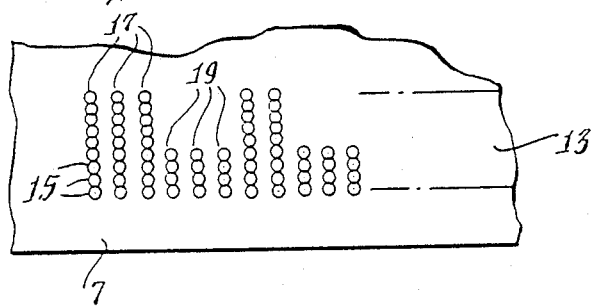
FIG. 3 is an enlarged portion of the bar code, showing how it is made up of dots printed by a dot matrix printer.
Figure 2:
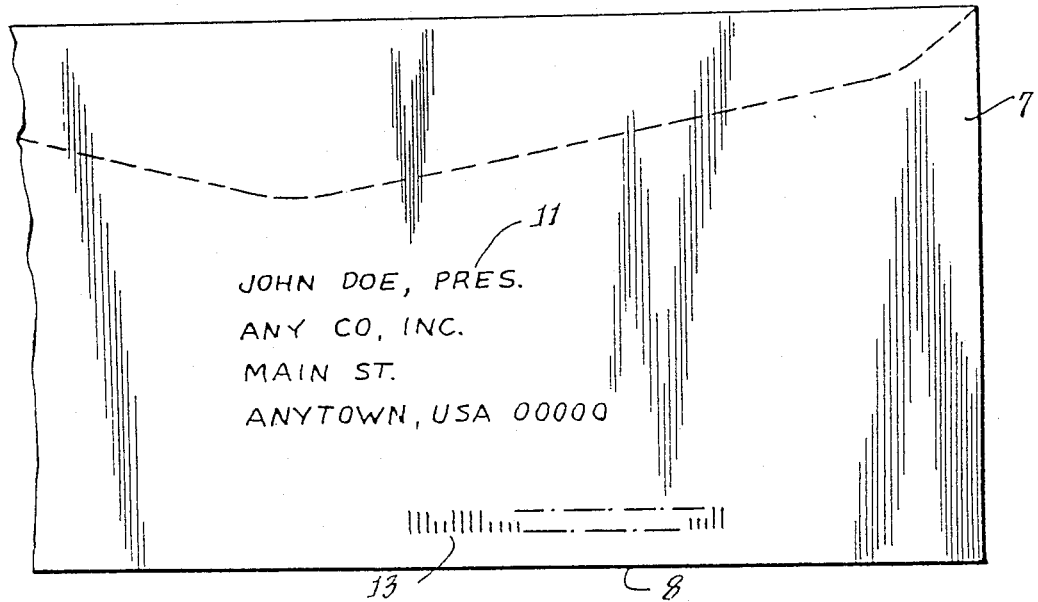
FIG. 2 is a portion of the face of an envelope showing the legibly-printed address and the line of bar code towards the bottom edge.

The addresser, i.e., the assembled unit for our bar code addressing system, is generally shown in the perspective view of FIG. 1; a sample addressed envelope, in FIG. 2; and an enlarged section of bar code, in FIG. 3.

Addresser 1 includes housing 3 and envelope bin 5 (containing envelopes 7). There is a control panel 9. The housing contains feed rollers, transport rollers, print heads and related gear, envelope position sensors, timing mechanisms and an internal system controller, all of which are described in more detail below.

The envelopes 7 to be addressed are placed in bin 5, and the addresser operated through control panel 9. The envelopes 7 will have imprinted on them a human-readable address 11 of up to five lines and a machine-readable bar code 13. The bar code is a series of long vertical lines 17 and short vertical lines 19. Each of the lines is formed of a series of dots 15 from a dot matrix print head. The bar code will be positioned parallel to, and proximate to, the lower edge 8 of envelope 7. The position of bar code 13 and the length and spacing of bars 17 and 19 will conform to the Postal regulations.

The printing itself occurs within the housing 3. Envelopes 7, with lower edge 8 against the back wall of bin 5, are drawn into the housing through nip 51 by feed roller 41, which is adapted to draw one envelope at a time from envelope bin 5. Thereafter, the envelopes are drawn through addresser 1 by a series of transport rollers 61, 67, 69, and 71.

Once inside the housing 3, the envelopes actuate position sensors 101, 102, and 103 which control envelope movement and cause an array 77 of print heads to print the address 11 and bar code 13 in the proper position, the last letters and bars of each line being printed first. Sensor 102, which is between the last pair of transport rollers 67 passed before printing and before the first of the print heads, or is in line with the first of the print heads (81 and 83, FIG. 4), is preferably used to control "Start print".

There is a print head for each line, and the print heads are longitudinally offset relative to one another, as seen in FIG. 4, to permit close spacing. We refer to this print head arrangement, in which the printing is done in parallel, with varying line starting times, and in which some of the print heads which are not adjacent (separated by one or more lines) starting at substantially the same times, as a non-sequential, staggered print head array.

"Start" times for the individual print heads are adjusted to correlate with the extent of offset.

The addresses printed initially come from a data base within the external computer 123. They have been transferred to the internal system controller 121. The controller has been programmed to print the addresses 11 in reverse sequence and to determine, and to control printing of, the proper bar codes 13 for the particular address. It is programmed to recognize the zip code in the address and to convert it to bar code. Reverse sequence is used because the envelopes are fed with the right-hand edge as the leading edge.

The bar code used is the one specified by the Postal service.

The Envelope Feed

In printing envelopes, it is important that the envelopes be fed to the printer exactly one at a time, and that one be fed every time.

The envelope feed structure of our invention is shown in FIGS. 1, 4, 6, and 9. This includes envelope feed bin 5, having a bottom surface 29, sloping downwardly in the direction of desired feed, a feed wall 31, against which the envelopes 7 press as a result of the slope of bottom surface 29, a back wall 33, and a slidable fence 34. After adjusting the slidable fence 34 so that the stack of envelopes will fit loosely, but in position within the bin, the envelopes 7 are placed in the bin 5 face up, with their lower edges 8 against back wall 33.

Figure 6:
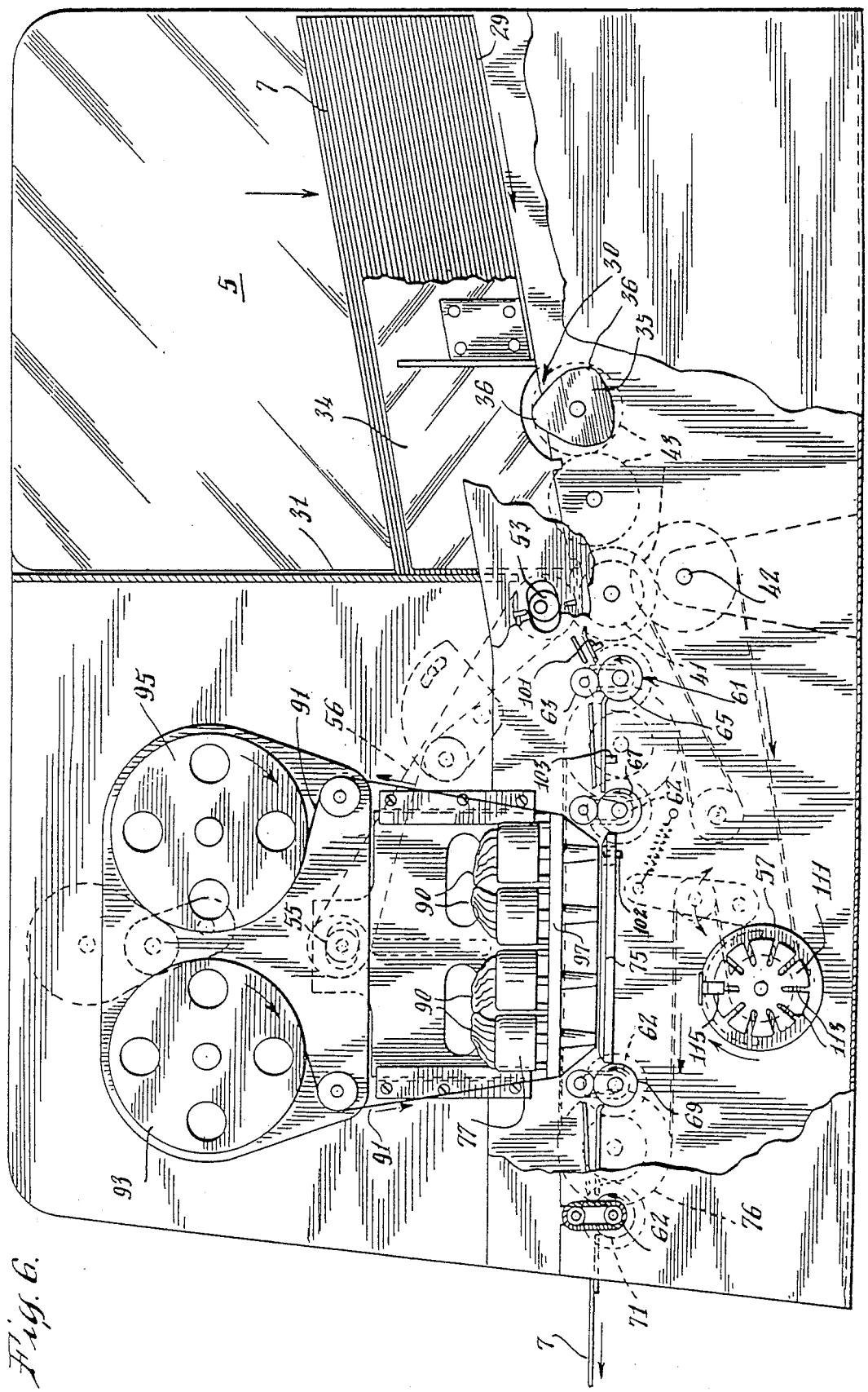
FIG. 6 is a vertical section from the front, taken on line 6—6 of FIG. 5. It shows the envelope feed mechanism and flow, the feed control sensors, and the printing heads.

The bottom surface 29 includes a transverse opening or slot 30, centrally of the stack of envelopes, through which projects the upper portion of first feed roller 35. This roller has a frictional surface with lobes 36 (FIG. 6). In our preferred form, the lobes on feed roller 35 provide an inner diameter of 1⅛ inch and an outer diameter of 1⅜ inch.

Feed roller 35 is driven through clutch 42 and is mounted on one-way roller bearings, so as to rotate freely (when clutch 42 is disengaged) only in the direction of desired motion of the envelopes (towards the feed wall 31). Upon rotation, roller 35, due to its lobed, high frictional, irregular shape, serves to jiggle or vibrate the stack of envelopes 7, so as to be certain that the stack of envelopes moves downwardly (that none get "hung up"), and also to push the lowermost envelope towards control surface 45.

Below feed wall 31 is a gate 32 having a rounded or cylindrical control surface 45. A transverse opening or nip 51 is formed between the lower portion of surface 45 and second feed roller 41. The upper surface of second feed roller 41 is approximately in the plane of surface 29 and, in effect, forms an extension of that surface. Like feed roller 35, roller 41 has a surface with envelope-engaging friction and is mounted and driven through one-way bearings, so as to rotate freely in the direction of the desired motion of the envelopes when clutch 42 is disengaged. Rollers 35 and 41 are coupled through coupling gears 43, and so are driven and act as one. For better control, feed rollers 35 and 41 should be single, integral (not segmented) rollers having a length greater than the width of the envelope.

The cylindrical control surface 45, shaped like a roller (and having a diameter of, say, one inch), is positioned above second feed roller 41. Surface 45 and roller 41 are spaced apart by a distance that is adjustable and just sufficient to permit the passage of a single envelope through the nip 51 formed by the two. Surface 45, in the nip area at 47, is relatively frictionless (having less friction than roller 41), being made of a smooth, durable material such as Lexan or teflon-impregnated, hard-coated aluminum. Above the frictionless area 47, is a highly frictional area 49, measuring about 15° of arc, which, we have found, can be made, for example, of fine emery cloth or fine sandpaper (grade 220 works successfully). This will contact the ends of the next lowest envelope and a few above it (depending upon thickness). Above area 49, and partially overlapping it, is a low friction surface 44, made of polyester plastic tape which slightly overlaps the frictional area 47. This permits the envelopes to freely drop until they reach frictional area 49.

The control surface 45 in conjunction with feed roller 41 provides for a positive feed of only single envelopes in seriatim, since a second envelope above the first would be prevented from moving by the frictional engagement of its leading edge with the high frictional surface 49.

The spacing of the nip 51 as well as the space between the print heads 81, 83, 85, 87, 89, and 92 and platen 75 can be varied by means of eccentrics 53 and 55 which turn simultaneously via anti-backlash chain 56. Eccentric 53 is positioned in a slot 54 in the cylinder forming control surface 45 which is slidably mounted on either end and guided by pins 37. Rotation of the eccentric 53 serves to lift the control surface 45, thus varying the size of the nip 51. The eccentric is made of metal and fits snugly within the slot 54 (made of polycarbonate plastic) to prevent backlash movement of the control surface 45.

The envelope feed mechanism operates on a signal from the internal system controller 121. This causes both feed rollers 35 and 41 to rotate in a direction such that their upper surfaces move the lowermost envelope 7 in the direction of the printing heads (described below). Because of its irregular shape, roller 35 serves to vibrate the stack of envelopes and to cause the lowermost envelope, which may have been held by friction surface 49, to drop down to the nip 51 between feed roller 41 and control surface 45. Roller 41 then drives this lowermost envelope longitudinally to the first set of transport rollers 61 leading to the print heads.

Once the transport rollers 61 have received the envelope from the nip 51, they draw it forward. When the leading edge of the envelope actuates position sensor 103, described below, clutch 42, controlling the drive for rollers 35 and 41, is disengaged, and the feed rollers 35 and 41 are no longer driven. The envelope can continue to move on the feed rollers 35 and 41, however, since these rollers are free to rotate on their one-way roller bearings.

The Transport Rollers

The transport rollers are shown in FIGS. 4, 5, 6, 7, and 8. They serve to draw the envelopes 7 over the printing platen 75 and beneath the print head array 77 for printing, to control the speed of movement of the envelopes beneath the print head array 77 so as to enable synchronization of the envelope motion with the rate of printing, and to eject the envelopes 7 after printing. For better control, transport rollers should be single, integral (not segmented) rollers having a length greater than the width of the envelopes being printed.

There are pairs of sets of transport rollers 61 and 67 to carry the envelopes 7 to the printing platen 75, and two pairs 69 and 71 to carry the envelopes away from platen 75. Set 61 is exemplary. It contains an upper roller 63 and a lower driven roller 65, both having elastomeric, frictional surfaces, such as rubber.

The two rollers 63 and 65 are interconnected by loop springs 62 and 64, one at each end of the rollers, spring-pressing the rollers together. The spring tension is greater on the back (inner) ends of the rollers. This differential tension gives the back end of the drive roller 65 a smaller effective diameter than the front end. The resulting difference in surface speed along the length of the drive roller 65 serves to force the envelope 7 rearwardly against vertical fence 79 as the envelope passes through the rollers 63 and 65. The same also applies to roller sets 67, 69, and 71. The pressure towards fence 79 presses envelope edge 8 tightly against fence 79 and so provides proper alignment and spacing while the bar code 13 is being printed. This is important due to the fact that the address and bar code must be precisely positioned on the envelope to meet the United States Postal Service specifications. Preferably, fence 79 is in the same plane as back wall 33.

All four sets of transport rollers 61, 67, 69, and 71 are designed so that the bottom rollers are gear driven. Their drives are interconnected with motor 57 and operate at the same speed. They also operate at the same surface speed as the feed rollers 35 and 41. The top rollers are free to float in the vertical direction (subject to the pressures of the loop springs). This is necessary to accommodate envelopes of various thicknesses and is done by mounting the ends of the top rollers in bushings which are free to slide in slots and which are held to the lower rollers with springs. The envelope passes through the transport rollers in the sequence 61, 67, 69, 71.

The pair of transport rollers 67 are the last pair which the envelope passes through prior to printing; and pair 69 is the first pair the envelope passes through after printing (see FIG. 4). We refer to these pairs as proximate. As can be seen, the entire print head array 77 is between these two pairs. By avoiding having any of the print heads separated by transport rollers possible slippage errors are reduced, resulting in better left justification of the lines of the printed address.

The Print Head Array

The print head array 77 is located just inside housing 3 and is shown in FIGS. 4, 5, 6, and 7. It consists of six dot matrix heads, five for the address lines and a sixth for the bar code.

Due to the difficulty of spacing the heads side by side (due to space limitations), the print heads are arranged in an array, that is, they are staggered (offset) longitudinally along the lines. This means that printing control software must adjust the timing of printing along each line to compensate for the offset positions of the heads, i.e., the algorithm adjusts the printing timing so the lines are properly positioned in the finished address.

A single, flat printing platen is positioned between pairs of transport rollers 67 and 69 so that the envelope 7 passes over it. The entire print head array 77 is mounted above this single platen. It consists of six print heads 81, 83, 85, 87, 89, and 92. The print heads are supported by support arm 97 (FIG. 7); and each print head has a mounting flange (such as flange 88 for head 87) mounted on arm 97. Electrical leads 90 connect the print heads to an internal system controller 121. Controller 121 is connected also to external computer 123.

Print heads 83 and 81 are the leading heads (printing first); as shown, they print the first and fifth lines of the address. 85 is next, printing the second line; 87 is next, printing the fourth line; and 89 and 92 are next, and are in parallel, printing the third line and the bar code line, respectively. Thus, the computer algorithm should be designed so printing of the individual lines starts with head 81 and 83 first, followed in sequence starting printing by 85, then 87, and then 89 and 92 together. We refer to this print head arrangement, in which printing is done in parallel, with varying line starting times, and some of the print heads which are not adjacent (separated by one or more lines; for example, heads 81 and 83 in FIG. 4)), starting at substantially the same times, as a non-sequential, staggered print head array.

This does not mean that the printing of one line must be completed before the next one is started, but, rather, that the printing of the individual lines takes place simultaneously with printing starting at different times for each line. That is, the time of commencement of printing of the individual lines varies, depending upon the extent to which the print head for the particular line is offset, but all six lines are being printed together in parallel.

A printing ribbon 91 passes between the print head array 77 and printing platen 75. It comes from feed reel 93 and is wound up on take-up reel 95.

The Position Sensors

In order to control envelope feed and to properly position the address and bar code on the envelopes, it is necessary to know the position of the envelopes as they pass through the feed rollers and the transport rollers. This is accomplished by use of position sensors coupled to the internal system controller 121.

The sensors are each made up of a reflective object transducer positioned in the envelope path to detect the presence or absence of an envelope in a specific position. The first sensor 101 is in the path between the second feed roller 41 and the first transport roller 61. The second sensor 103 is between the first and second transport rollers 61 and 67. The third sensor 102 is mounted on the bottom of the print platen 75 between the last entering pair of transport rollers 67 and either before or in line with the first of the print heads.

Position tracking is accomplished with the circuit of the internal system controller 121. It is an electronic control system which responds to signals picked up by the sensor 115 from timing control wheel 111, described below, and to signals from sensors 101, 102, and 103. The signals are directly related to the distance which each envelope travels and are used to control when each print head starts to print and at what speed it should print.

If we assume that an envelope has started to move through gate 32 in the feed wall 31, driven by feed rollers 35 and 41, then it will intercept sensor 101 shortly after its leading edge passes through nip 51. No controlling action is taken at this time. When the envelope's leading edge passes through transport rollers 61 and intercepts sensor 103, circuitry is thereby activated to disengage clutch 42 controlling the feed rollers and causes them to stop being driven. Removal of power from the feed rollers will have no effect upon envelope motion, since the feed rollers are on one-way bearings and, by that time, the first transport roller 61 will be drawing the envelope along. This removal of power, however, prevents the feed rollers from starting to feed a second envelope.

When the envelope's leading edge passes through the second set of transport rollers 67 and intercepts sensor 102, the printing sequence will be activated to synchronize the operation of print head array 77 with the position of the envelope. Locating sensor 102 as close as possible to where printing commences is useful for achieving uniform character spacing and good left justification. Our preferred location for sensor 102 is in line with the first print heads reached (81 and 83 of FIG. 4). The printing sequence will then be activated by sensor 102 to synchronize the operation of print head array 77 with the position of the envelope.

When the trailing edge of the envelope reaches the first sensor 101, the feed rollers are again actuated, starting the next envelope through the printing cycle.

This control could be accomplished through use of sensor 103 only for both purposes. This, however, results in more gap between envelopes and a slower overall throughput for the machine.

The Timing Mechanism

The drive motor 57 (FIG. 5) is coupled to and drives all of the feed and transport rollers. It is also directly coupled to timing control wheel 111 which has equally spaced timing slots 113 about its periphery.

The rate of printing is controlled by the speed of drive motor 57. Because the drives are coupled to the motor, the motor speed is directly related to the rate of motion of the envelopes. Thus, the envelope speed is directly related to the speed of rotation of timing control wheel 111. Wheel 111 normally rotates at about 5,500 RPM.

Wheel 111 has slots 113 so spaced that the distance between them is equivalent to 0.00793" of linear movement of the envelopes; and a sensor 115 is mounted about the wheel 113 so as to detect the gaps or slots 113. This sensor 115 is connected to the internal system controller 121 and so serves to synchronize the printing with the envelope's linear motion, i.e., this electronic control system tells each print head when to commence to print and the rate at which it should print.

We have found that we can print at a linear speed of about 16 inches per second. This equates to about 7,600 small (#6) envelopes per hour, or about 5,400 large (#10) envelopes per hour.

Computer Control

Electronic control of the system is through internal system controller 121 which is connected to, and, with appropriate software, controls, the feed and transport rollers and the print heads. Flow charts for a typical program are shown in FIGS. 10, 11, 12, and 13.

The software flowcharts show status loop (FIG. 11), communications interrupt (FIG. 12), and print interrupt (FIG. 13).

An interrupt is an event triggered by the hardware in the system; and it causes a certain section of the software in the internal system controller 121 to be implemented. It may occur asynchronously with respect to other sections of the software. In our envelope addressing system there are two types of interrupt: the communications interrupt (FIG. 12) which accepts address data from the external computer 123, and the print interrupt (FIG. 13) which occurs each time a gap 113 in timing control wheel 111 is sensed (FIGS. 5 and 10). The print interrupt is used to synchronize the firing of the print heads of array 77 (i.e., printing dots on paper) with the motion of the envelopes 7 past the print heads.

The status loop is considered the "foreground task" because it is always running and controlling operation of our envelope addressing system. The two interrupt routines are considered "background tasks" because they are only run when their corresponding hardware event occurs. When an interrupt is through, control passes back to the status loop at the same position in its cycle as before the interrupt.

The status loop (FIG. 11) works upon initialization to clear RAM memory. It then checks the front panel switches 9 until it finds either the "test message" or "on-line" switch actuated.

If "test message", a previously stored address is loaded into the print buffer and is scanned for a valid zip code. The zip code is converted to a bar code having specifications conforming to Postal regulations, and the entire address (legible and bar) is converted to a graphics image and placed in the print buffer. Motor 57 is turned on to enable printing, and clutch 42, controlling feed rollers 35 and 41, is actuated to start envelope feeding. The motor and clutch have been controlled by internal system controller 121.

If the "on-line" switch has been actuated while the unit is off, the controller 121 is enabled to accept address data from external computer 123 and to print it. (If actuated while the unit is on, the switch turns it off). When address data is received, a bar code is produced, the address is converted to graphic image, and printing is enabled as in the test message processing routine. It should be noted that, since the communications interrupt has been previously enabled, there must be data in the communications buffer to print.

The communications interrupt routine (FIG. 12) is called whenever a new byte of data is transmitted to the internal system controller 121 from the external computer 123. There are two such routines, serial interrupt and parallel interrupt (FIG. 10). The difference between them is that the serial interrupt is called when information is received through the serial port, and the parallel interrupt is called when information is received through the parallel port (Normally only one of these will be used for a particular installation). Both routines work in the same fashion except for the source of data.

When data is received from the communications port, it is checked for format error. If error has occurred, the data is discarded, and an error flag is set for the status loop, to shut down operation until it has been corrected. If the data is valid, it is stored in the communications buffer for later use. When this buffer is full, communications are temporarily stopped.

The communications buffer is the region in the RAM memory of the internal system controller 121 set aside for storing incoming addresses. In the present configuration of the machine, there is room for up to nine addresses. Thus, the external computer 123 may transmit data at a faster rate than the print heads are capable of printing, and up to nine addresses may be sent. When nine addresses are stored in the communications buffer, the program shuts off communications. This prevents the external computer 123 from sending address information to the printer. After a communications interrupt is through, the status loop routine will be put back in control at the same point in execution as it was before the interrupt. As an address is printed, the address information in the pertaining section of communications buffer is erased, and that section of the buffer is then free to receive another address. Communications is then restarted, enabling the external computer 123 to again send address data to the internal controller 121.

The print buffer is a region in RAM memory of the internal system controller 121 in which the "graphics representation" of data to be printed is stored. What we call "graphics representation" is a mapping of the individual dots which must be printed in order to produce readable characters, and also includes the bar code, obtained by conversion of the zip code in the address. This contrasts with the data in the communications buffer, which is in the form of ASCII data (a machine format of the data). This print buffer is filled with data prior to printing, and, as printing progresses, is cleared to make way for the next address to be printed.

Printing is controlled by the position sensors 101, 102, and 103 and the print interrupt. The sensors are read, and if the third sensor 102 detects the presence of an envelope, the counting mode is entered. This means that a counter in controller 121 is incremented until it shows that the envelope 7 is at the proper position to start printing. At this time the printing mode is enabled and the counting mode is disabled except to control printing speed (for proper spacing of characters and of the bars in the bar code). The time of enablement of the printing mode varies between the individual lines to adjust for the relative positions of the individual print heads in the print head array. When the printing mode is enabled, the program loads the print heads with data from the print buffer.

If the software is not in printing or counting mode, it is counting the number of interrupts which have occurred since the clutch was turned on. If too many have been executed, it means that an envelope has not traveled out of the bin (due either to feed failure or to lack of envelopes). If such occurs, a signal is given, the motor is shut off, error light is turned on, and the controller returns to the status loop.

Operation

To operate our bar code addressing system, the desired addresses are entered into the data bank of external computer 123; the size of nip 51 and the gap between the print heads and platen is set by adjusting the knob which turns eccentrics 53 and 55 for the envelope thickness; slidable fence 34 is set for the width of the envelopes; and envelopes 7 are loaded into bin 5 face up.

It is then only necessary to start the system.

When the machine is on line and has valid address data, the clutch is engaged causing feed rollers 35 and 41 to turn. The leading edge of the envelope 7 located at the bottom of the stack will be in contact with the frictional surface 49 of the rounded control surface 45. The first feed roller 35, because of its lobed surface 36, will cause the stack of envelopes to vibrate and the envelope at the bottom to lose contact with frictional surface 49. The envelope is then drawn by second feed roller 41 (which has a surface of higher friction than surface 47 on control surface 45) through the transverse opening or nip. The leading edge of envelope 7 then passes to first transport roller 61.

After the leading edge of the first envelope passes the first transport rollers 61, it passes by sensor 103 which disengages the clutch 42 and thus stops feed rollers 35 and 41 from being driven. Since rollers 35 and 41 are on unidirectional bearings, they can be driven when the clutch 42 is engaged but will rotate freely when an envelope is being pulled past them by the transport rollers and the clutch is disengaged. As the trailing edge of each envelope passes each feed roller, the roller stops rotating which prevents the next envelope from being driven towards gate 32.

When the leading edge of the envelope passes through transport rollers 67, it then passes sensor 102 and so starts the printing timing mechanism.

The first envelope then passes under the print head array 77. Five of the print heads in the array of 6 print one line of the address, and the sixth print head prints the line of bar code. The computer software obtains the zip code for the bar code from the address in the data bank and converts it to the type bar code desired.

When the trailing edge of the first envelope passes the first sensor 101, the clutch is re-energized and the next envelope begins its motion towards gate 32.

In summary, stacked envelopes are fed through nip 51 one at a time and their position sensed by sensors 101, 103, and 102, so that the feeding of the envelopes and operation of the print heads will be controlled and synchronized. The system will then operate by itself and print addresses and bar codes on the envelopes. The various controls built into our system will serve to assure that placement and size of the bar code will satisfy Postal regulations.

We claim:

1. An envelope feed control system for feeding envelopes longitudinally into a printer, said system including
    an envelope feed bin, said bin including a bottom surface sloping downwardly in the direction of desired feed and an end wall extending vertically above the lower end of said bottom surface,
    said bottom surface including an opening therein proximate to said lower end, a feed roller positioned in said opening,
    a non-rotatable, unitary, rounded control surface below said end wall and above said feed roller, said control surface and said feed roller defining an envelope gate, said gate being dimensioned to permit passage of one envelope at a time, and
    said control surface having a low friction area in the vicinity of said gate and having an area of greater friction thereabove on the portion thereof facing said bin, said low friction area having lesser friction than that of said feed roll,
    whereby envelopes may be fed singly through said gate and the envelope above the one being fed will be prevented from moving by the frictional engagement of its leading edge with said area of greater friction.

2. An envelope feed control system as set forth in claim 1 in which the distance from the top of said low friction area to the top of said feed roller is less than the thickness of two said envelopes being fed from said bin.

3. An envelope feed control system as set forth in claim 1 and including a second low friction area on said control surface, said second area having lesser friction than said area of greater friction.

4. An envelope feed control system as set forth in claim 3 in which said second low friction area partially overlaps said area of greater friction.

5. An envelope feed control system as set forth in claim 1 in which said area of greater friction is formed of abrasive material.

6. An envelope feed control system as set forth in claim 2 in which said feed roller is integral and has a length greater than the width of the envelope to be fed.

7. A feed control system for feeding envelopes longitudinally into a printer, said printer requiring precise alignment, said system including
    a feed control bin shaped to hold a stack of envelopes to be fed individually, said bin having an exit gate at one end thereof and a bottom surface sloping towards said exit gate, and envelope alignment guides on the sides thereof,
    said exit gate including a feed roller and a fixed, rounded control surface thereabove, said feed roller being driven and having a frictional driving surface,
    said non-rotatable, rounded control surface being mounted above said feed roller and positioned relative to said feed roller as to form a nip therewith, said nip being dimensioned to permit only one envelope from said stack to pass therethrough at a time, and
    said control surface having a first area of low friction relative to said feed roller in the area proximate to said nip and a second area above said first area of greater friction than that of said first area,
    whereby actuation of said feed roller will feed the lowermost of said envelopes through said nip in longitudinal motion towards said printer.

8. A feed control system as set forth in claim 7 including frictional vibrating means in said bin and positioned in association with said bottom surface,
    whereby a stack of envelopes in said bin can be vibrated to cause them to drop past said second area one at a time, permitting them to be drawn individually into said nip by said feed roller.

9. A feed control system as set forth in claim 8 in which said vibrating means is an irregularly-shaped roller, said roller being coupled to said feed roller for conjoint movement.

10. A feed control system as set forth in claim 9 in which said irregularly-shaped roller is lobed.

11. A feed control system as set forth in claim 9 in which said feed roller and said irregular roller are mounted upon one-way bearings, and having transport rollers for drawing an envelope from said exit gate,
    whereby the lowermost envelope in said stack can continue to be drawn through said nip by said transport rollers after said feed roller and said irregular roller cease to be driven.

12. In an envelope feeding system adapted to print addresses longitudinally of envelopes, envelope feeding means for feeding envelopes from a stack including
    an envelope receiving bin to hold a stack of envelopes, said bin having a sloped lower surface, an end wall and at least one fence positioned to hold envelopes in aligned position with their ends facing said end wall,
    a gate proximate to the lower end of said sloped surface and below said end wall, said gate including a driven feed roller and, above said driven feed roller, an opposed control surface, said roller and said surface defining a nip dimensioned to receive envelopes from said stack one at a time, said feed roller having a surface with envelope-engaging friction and said control surface having an area of lesser surface friction, relative to said feed roller, at said nip and to a height less than the thickness of two envelopes in said bin, and said control surface including an upper area of greater friction relative to said area of lesser friction on said control surface and contiguous with said area of lesser surface friction,
    whereby said feed roller, acting in conjunction with said control surface, may feed envelopes singly through said gate.

13. In an envelope feeding system as set forth in claim 12, means for adjusting the width of said nip, whereby envelopes of different thicknesses may be received.

14. In an envelope feeding system as set forth in claim 12, means associated with said lower surface for vibrating the bottom of said stack of envelopes held in said bin and for pushing the lowermost envelope towards said control surface.

15. In an envelope feeding system as set forth in claim 14, in which said vibration means includes a second feed roller, driven in conjunction with said first feed roller, said second feed roller being positioned in an opening in said lower surface and projecting into said bin in contact with the lowermost of the envelopes in said bin, said second feed roller being irregular in shape whereby said roller will vibrate said envelopes while pushing the lowermost said envelope towards said first feed roller.

16. In an envelope addressing system as set forth in claim 12, a plurality of transport rollers opposite said gate and outside said bin for receiving said envelopes and carrying them to a printing area.

17. In an envelope feeding system as set forth in claim 12 a third area on said control surface above and contiguous with said upper area, said third area having lesser friction than said upper area.

* * * * *